(12) United States Patent
Seshubabu et al.

(10) Patent No.: US 10,759,663 B2
(45) Date of Patent: Sep. 1, 2020

(54) MULTI-METAL CATALYST COMPOSITION FOR PRODUCTION OF MORPHOLOGY CONTROLLED CNT'S AND PROCESS THEREOF

(71) Applicant: Indian Oil Corporation Limited, Mumbai (IN)

(72) Inventors: Narayanam Seshubabu, Faridabad (IN); Palvannan Mohanasundaram, Faridabad (IN); Bhanumurthy Samala, Faridabad (IN); Naduhatty Selai Raman, Faridabad (IN); Rashmi Bagai, Faridabad (IN); Sankara Sri Venkata Ramakumar, Faridabad (IN); Biswapriya Das, Faridabad (IN)

(73) Assignee: Indian Oil Corporation Limited, Mumbai (IN)

( * ) Notice: Subject to any disclaimer, the term of this patent is extended or adjusted under 35 U.S.C. 154(b) by 330 days.

(21) Appl. No.: 15/915,289

(22) Filed: Mar. 8, 2018

(65) Prior Publication Data

US 2018/0339905 A1 Nov. 29, 2018

(30) Foreign Application Priority Data

May 23, 2017 (IN) .............................. 201721018010

(51) Int. Cl.

| | | |
|---|---|---|
| *C01B 32/162* | (2017.01) |
| *B01J 23/00* | (2006.01) |
| *B01J 21/14* | (2006.01) |
| *B01J 37/03* | (2006.01) |
| *B01J 35/10* | (2006.01) |
| *B01J 37/08* | (2006.01) |
| *B01J 23/881* | (2006.01) |
| *B01J 23/882* | (2006.01) |
| *B01J 23/883* | (2006.01) |
| *B01J 23/889* | (2006.01) |
| *B01J 8/02* | (2006.01) |
| *B01J 8/24* | (2006.01) |

(52) U.S. Cl.
CPC ............ *C01B 32/162* (2017.08); *B01J 21/14* (2013.01); *B01J 23/002* (2013.01); *B01J 23/881* (2013.01); *B01J 23/882* (2013.01); *B01J 23/883* (2013.01); *B01J 23/8898* (2013.01); *B01J 35/1019* (2013.01); *B01J 35/1042* (2013.01); *B01J 35/1047* (2013.01); *B01J 35/1061* (2013.01); *B01J 37/031* (2013.01); *B01J 37/088* (2013.01); *B01J 8/02* (2013.01); *B01J 8/24* (2013.01); *C10G 2300/1037* (2013.01)

(58) Field of Classification Search
CPC ... C01B 32/162; C01B 32/158; C01B 32/159; C01B 32/16; C01B 32/164; C01B 32/166; C01B 32/168; C01B 32/17; C01B 32/172; C01B 32/174; C01B 32/176; C01B 32/178; C01B 2202/02; C01B 2202/04; C01B 2202/06; C01B 2202/08; C01B 2202/10; C01B 2202/20; C01B 2202/22; C01B 2202/24; C01B 2202/26; C01B 2202/28; C01B 2202/30; C01B 2202/32; C01B 2202/34; C01B 2202/36; B01J 35/1019; B01J 37/088; B01J 35/1047; B01J 35/1042; B01J 35/1061; B01J 37/031; B01J 21/14; B01J 23/8898; B01J 23/883; B01J 23/882; B01J 23/881; B01J 23/002; B01J 8/24; B01J 8/02; C10G 2300/1037

See application file for complete search history.

(56) References Cited

U.S. PATENT DOCUMENTS

| | | |
|---|---|---|
| 7,157,068 B2 | 1/2007 | Li et al. |
| 8,137,591 B2 | 3/2012 | Kim et al. |
| 8,696,943 B2 | 4/2014 | Kambara et al. |
| 9,084,990 B2 | 7/2015 | Silvy et al. |
| 2009/0140215 A1 | 6/2009 | Buchholz et al. |
| 2013/0039839 A1 | 2/2013 | Hocke et al. |
| 2013/0171054 A1* | 7/2013 | Kim ................... B01J 23/8898 423/447.2 |
| 2014/0072505 A1 | 3/2014 | Fonseca et al. |

FOREIGN PATENT DOCUMENTS

| | | |
|---|---|---|
| EP | 2835177 A1 | 2/2015 |
| WO | 2014188439 A1 | 11/2014 |

OTHER PUBLICATIONS

Periodic Table Atomic Table of the Elements, NIST SP 966 (Sep. 2003) (Year: 2003).*

* cited by examiner

*Primary Examiner* — Daniel C. McCracken
(74) *Attorney, Agent, or Firm* — Melissa M. Hayworth; E. Joseph Gess

(57) ABSTRACT

A catalyst composition for the production of carbon nanotubes (CNT) with controlled morphology is disclosed. The catalyst is represented by formula $[(M_xMn_y)Mo_z]$[binary metal oxide]$_{(100-(x+y+z))}$, where x is in the range 1 to 25 wt %, y is in the range 0.1 to 20 wt %, and z is in the range 0.0 to 10 wt %. Further M represents either iron or cobalt or nickel along with manganese and molybdenum supported on binary metal oxides comprising of boron, magnesium, aluminum, silicon, calcium, barium, and combination thereof. The CNT morphology can be tailor-made with the plural combination of nature of metal and promoters in appropriate proportions. The process yields the CNT with bulk density in the range of 0.01 to 0.20 g/cc, diameter in the range of 5 to 30 nm and purity greater than 95 wt %.

15 Claims, No Drawings

MULTI-METAL CATALYST COMPOSITION FOR PRODUCTION OF MORPHOLOGY CONTROLLED CNT'S AND PROCESS THEREOF

RELATED APPLICATION

The present application claims priority to Indian Application No. 201721018010 filed May 23, 2017, the contents of which are incorporated herein by reference in their entirety.

FIELD OF THE INVENTION

The present invention relates to the preparation of catalyst composition for the production of carbon nanotubes (CNT) with controlled morphology such as bulk density and tube diameter.

BACKGROUND OF THE INVENTION

CNT research has been much progressed since its discovery and due to their versatile electrical, thermal and mechanical properties, and numerous applications have emerged for structural and electrical applications. Techniques like arc discharge, laser ablation and catalytic chemical vapor deposition (CVD) attempt to produce the CNT in the mass scale. CVD is considered to be the promising method due to low cost, ease of operation and tunable CNT growth control. It is well known that catalytic CVD process required the presence of the catalyst for the growth of CNT at the temperature range of 500° C. to 900° C. employing hydrocarbon feedstock. In this context, transitional metals of Group VIII metals such as iron, cobalt, and nickel are found to be effective in view of their ability in forming meta-stable carbide bond and high carbon solubility. However, the efficacy of these catalysts relies upon several parameters such as metal-promoters combination, metal dispersion, preparation method, and nature of oxide support and metal-support interaction.

U.S. Pat. No. 8,137,591B2 discloses the catalyst composition $[Fe_aCo_bNi_c]_p [Mg_xAl_ySi_z]_q$ for preparing carbon nanotube. The apparent density of CNT is disclosed as 0.03 to 0.08 g/cc and diameter of 5 to 20 nm. The disclosed catalyst composition comprises the employing of pre-synthesized nano-silicon powder with controlled particle size as one of the oxide supports. However, preparation of nano silicon powder is cumbersome as it involves the catalytic/high energy mechanical operation and therefore makes the catalyst expensive, and limits the catalyst scale up. Furthermore, low catalytic yields of CNT is disclosed, that is 1900% to 2400%, which is considered to be lower yields for process scale up.

U.S. Pat. No. 8,696,943B2 discloses the catalyst containing Fe and Co and at least one of the other elements consisting of Ti, V, Cr, and Mn; and a compound containing at least one element selected from the group consisting of W and Mo for CNT production. The catalysts described here are prepared by impregnation method, however low density multi-walled carbon nanotubes not disclosed employing of binary oxide supported catalysts. In addition, disclosed catalysts consist of iron, cobalt as the main metals along with promoters in the presence of oxide support carrier.

US20130171054A1 discloses the Fe, Co, and Mn supported catalyst for synthesizing multi-walled carbon nanotubes using gaseous hydrocarbon feedstock employing the catalyst composition, Fe:Co:Mn=1:x:y, wherein x and y are mole ratios and $2.0 \leq x \leq 4.0$ and $0.01 \leq y \leq 5.0$. The catalysts disclosed herein are prepared by incipient wetness impregnation supporting on aluminum oxide, magnesium oxide, silicon dioxide or a combination thereof in a solvent.

U.S. Pat. No. 9,084,990B2 discloses the multi-wall carbon nanotubes employing alumina and magnesium aluminate supported $Co_xFe_yMoO_4$, $Fe_2(MoO_4)_3$ and blends thereof, wherein the atomic ratio of magnesium oxide to alumina is about 0.02 to 0.04, wherein x and y for the mixed metal oxides represented by $Co_xFe_yMoO_4$ is from about 1.6 to 6.5, and 0 to 10.5, respectively. However, this invention does not deal the selective catalyst composition for carbon nanotubes with controlled morphology with respect to density and tube diameter.

US20140072505A1 describes the production of helical carbon nanotubes along with another form of carbon nanotubes including single walled, double walled and multi-walled employing the layered multiphase catalysts prepared by impregnation and co-precipitation methods, wherein catalyst nanoparticles are reported to be located in the core or outer layers.

US20130039839A1 describes the production of carbon nanotubes with the bulk density of 130 g/liter with purity of 90 wt % employing co-precipitated catalysts, wherein the disclosed catalyst is pre-reduced at the temperature in the range of 300-900° C. before commencing the carbon nanotube production. The disclosed yield of carbon nanotubes is reported as 33.2 g/g-cat with the bulk density of 152 g/l.

US20090140215A1 discloses the CNT production with tube diameter of 3-150 nm and an aspect ratio greater than 100 employing the catalyst comprising cobalt, manganese supported on magnesia in an appropriate metal to support proportions. In this disclosure also, catalyst is pre-reduced for the CNT production.

EP2835177A1 discloses the method of producing the CNT using carbon black supported CoMn catalysts prepared by co-precipitation method employing urea as precipitating agent. However the metal-support interaction is weak in carbon supported catalysts, as a result low yields of CNT is reported.

U.S. Pat. No. 7,157,068B2 discloses the catalysts in gas phase employing organo metallic precursors namely metallocenes of iron, cobalt and nickel deposited on material substrate inside the reactor to produce non-aligned CNT of different morphology. The catalysts disclosed here is to generate metal nanoparticles upon heating condition and these species are responsible for the hydrocarbons decomposition. However, scaleup of the process is economically not viable due to high cost of metallocenes precursor for in-situ generation of the catalytic particles.

WO2014188439A1 describes the carbon dioxide free production of hydrogen and bamboo shaped carbon nanotubes by decomposition of lower hydrocarbons over the supported transitional catalysts based on Fe, Co and Ni in combination with Cu or Zn supported on alumina. The catalysts disclosed in this prior art are prepared by wet impregnation method, however CNT morphology with catalyst composition is not disclosed.

From the above prior art, it is evident that these processes are not viable for large-scale production based on their catalyst composition in particular for the tunable morphology of CNT. Moreover, selective production of CNT with variable morphology of bulk density and diameter on mass scale employing the binary oxide supported multi metal catalyst is yet to be unknown in the art. In this context, present invention disclosed the catalyst composition with active transitional metal in combination of structural and textural promoters for the production of CNT with controlled morphology.

SUMMARY OF THE INVENTION

This summary is provided to introduce a selection of concepts in a simplified format that are further described in the detailed description of the invention. This summary is not intended to identify key or essential inventive concepts of the claimed subject matter, nor is it intended for determining the scope of the claimed subject matter.

The present invention as embodied and broadly described herein discloses a catalyst for the production of carbon nanotubes with variable morphology of density and tube diameter, the catalyst is represented by the formulae $[(M_xM-n_y)Mo_z]$ [binary metal oxide]$_{(100-(x+y+z))}$, wherein x is in range of 1 to 25 wt %, y is in range of 0.1 to 20 wt %, and z is in range of 0 to 10 wt %. In the disclosed catalyst composition, the metal, herewith referred as M is selected from atleast one of the Group VIII metals selected as main active metals such as iron, cobalt or nickel, while either one of the Group VIB or VIIB metals or combination thereof, preferably manganese, molybdenum acts as structural promoter, herewith referred as SP and binary metal oxides selected from combination of magnesium, calcium, barium, aluminum, silicon, boron, is preferred as textural promoter, herewith referred as TP.

An aspect of the present invention is to provide a precipitation method for preparation of the disclosed catalyst composition. However, the disclosed catalyst composition is not limited to other preparation methods namely incipient wet-impregnation of metal precursors on pre-formed oxide support, deposition-precipitation of metal precursors on oxide support, homogeneous deposition-precipitation, and co-precipitation method. Further, catalyst preparation preferably involves the precipitation of metal precursor solutions of active transitional metals, manganese, molybdenum and magnesium with basic colloidal solution of alumina or silica in the pH range of 7 to 10. The resultant catalyst precipitate is filtered under vacuum to remove the excess of water and then dried in hot air oven at 100-130° C. followed by calcinations at temperature range of 400 to 600° C.

Another aspect of the present invention is to provide a process for the production of morphology controlled CNT comprising the loading of the catalyst in the horizontal or vertical reactor, where catalyst is being heated to the reaction temperature of 600 to 900° C. in inert gas atmosphere, preferably nitrogen. The liquid or gaseous hydrocarbon feed preferably selected from saturated or unsaturated $C_1$ to $C_{10}$ hydrocarbons is pre-heated in the range of 200 to 400° C. in the pre-heater section of the reactor to vaporize the feed before reaching the hot catalyst zone, wherein feed vapor is converted into carbon nanotubes over the heated catalyst. The disclosed process yields the CNT with morphology control employing a selective catalyst composition. The catalytic yields of the CNT resulted with bulk density in the range of 0.01 to 0.2 g/cc, tube diameter in the range of 5 to 30 nm and purity achieved greater than 95 wt %. The CNT with variable bulk density gradient can be suitable for multiple applications particularly suitable for energy, lightweight materials, batteries, engineering plastics, conductive polymers etc. Further, the disclosed catalyst composition augurs well for large scale production of CNT with tailor made morphology.

OBJECT OF THE INVENTION

It is the primary object of the invention to disclose a catalyst for producing carbon nanotube (CNT) with bulk density in the range of 0.01 to 0.2 from the liquid hydrocarbons of crude oil.

It is further object of the invention to disclose the precipitation method for preparation of the disclosed catalyst composition.

It is yet another object of the invention to disclose the process for production of carbon nanotube using the catalyst as disclosed in present invention.

DETAILED DESCRIPTION OF THE INVENTION

It should be understood at the outset that although illustrative implementations of the embodiments of the present disclosure are illustrated below, the present invention may be implemented using any number of techniques, whether currently known or in existence. The present disclosure should in no way be limited to the illustrative implementations, and techniques illustrated below, but may be modified within the scope of the appended claims along with their full scope of equivalents.

The terminology and structure employed herein is for describing, teaching and illuminating some embodiments and their specific features and elements and does not limit, restrict or reduce the scope of the claims or their equivalents.

Reference throughout this specification to "an aspect", "another aspect" or similar language means that a particular feature, structure, or characteristic described in connection with the embodiment is included in at least one embodiment of the present invention. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more elements or structures or components proceeded by "comprises . . . a" does not, without more constraints, preclude the existence of other elements or other structures or other components or additional elements or additional structures or additional components.

Unless otherwise defined, all technical and scientific terms used herein have the same meaning as commonly understood by one of ordinary skilled in the art to which this invention belongs. The system, methods, and examples provided herein are illustrative only and not intended to be limiting. Embodiments of the present invention will be described below in detail with reference to the accompanying drawings.

Any particular and all details set forth herein are used in the context of some embodiments and therefore should NOT be necessarily taken as limiting factors to the attached claims. The attached claims and their legal equivalents can be realized in the context of embodiments other than the ones used as illustrative examples in the description below.

The purpose of the present study is to investigate the effect of active metal and synergetic combination of structural and textural promoter of the catalyst composition on density gradient of CNT through response of surface methodology. To achieve the desired objective, catalyst composition is made up of plural combination of active transitional metals in presence of structural and textural promoters thereof in appropriate ratios.

In a typical catalyst composition, the pre calculated amounts of precursors of M is selected from either iron, cobalt or nickel (Fe, Co, Ni), and precursors of structural promoter (SP) selected from manganese, molybdenum (Mn, Mo) and one of the component of binary oxide support selected from magnesium, calcium, barium, preferably selected from magnesium dissolved independently in de-mineralized water. After dissolving all the precursor components, they are mixed together in a separate container, which is referred as solutions I. On the other hand, precursors of textural promoter (TP) is one of the precursors preferably selected from stabilized colloidal solutions of silicon, or aluminum in calculated amounts, is referred as Solution II, which is used for precipitation of above prepared acidic metal precursor solution, that is solution I. Further, solutions of I and II are gradually mixed at controlled flow rate in presence of pre-calculated quantity of water wherein pH is being maintained in the range of 7 to 9.

In an embodiment, a catalyst for producing carbon nanotube (CNT) with bulk density in the range of 0.01 to 0.2 from the liquid hydrocarbons of crude oil represented by formula:

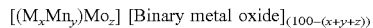

[$(M_xMn_y)Mo_z$] [Binary metal oxide]$_{(100-(x+y+z))}$ wherein x, y and z are weight percentage based on total weight of the catalyst; x is in the range of 1 to 25 wt %, y is in the range of 0.1 to 20 wt % and z is in the range of 0.0 to 10 wt %; and M is a metal selected from Group VIII metals.

According to an aspect of the present subject matter, in said embodiment the metal M is selected from the group consisting of iron, cobalt or nickel.

According to an aspect of the present subject matter, in said embodiment the binary metal oxide is selected from the oxides of magnesium, calcium, barium, aluminium, silicon, boron and combination thereof.

According to an aspect of the present subject matter, in said embodiment the catalyst has a surface area in the range of 100 to 400 $m^2$/gm, preferably in the range of 100 to 250 $m^2$/gm; average pore diameter in the range of 5 to 25 nm; and average pore volume in the range of 0.4 to 1 cc/gm.

In another embodiment, a process for preparation of the disclosed catalyst for synthesizing carbon nanotube, comprising step (a) dissolving a precursor of a metal salt in de-mineralized water to obtain a metal salt solution; step (b) dissolving a precursor of structural promoter in de-mineralized water to obtain a structural promoter solution; step (c) dissolving a precursor of binary metal oxide in de-mineralized water to obtain a binary metal oxide solution; step (d) mixing the metal salt solution, the structural promoter solution and the binary metal oxide solution to obtain a solution I; step (e) gradually mixing and precipitating the solution I with precursor of a textural promoter at controlled flow rate in presence of water to obtain a catalyst slurry; step (f) washing the catalyst slurry with hot water and drying at a temperature; and step (g) calcining the product of step (f) to obtain the catalyst.

According to an aspect of the present subject matter, in said embodiment the precursor of metal salt is selected from the group consisting of nitrate, acetate, acetyl acetonate, chloride, sulfate forms of iron, cobalt or nickel.

According to an aspect of the present subject matter, in said embodiment the precursor of structural promoter is selected from the group consisting of manganese nitrate, manganese chloride, manganese sulphate or ammonium heptamolybdatetetrahydrate or combination thereof.

According to an aspect of the present subject matter, in said embodiment the precursor of binary metal oxide is selected from the group consisting of sodium silicate, sodium aluminate, ammonium polysilicate.

According to an aspect of the present subject matter, in said embodiment the binary oxide support is selected from the group consisting of nitrate, acetate, acetyl acetonate, chloride or sulphate form of Group II metals.

According to an aspect of the present subject matter, in said embodiment the pH of the precipitation medium is maintained in the range of 7 to 10.

According to an aspect of the present subject matter, in said embodiment the drying in step (f) is performed at a temperature in the range of 100° C. to 200° C.

According to an aspect of the present subject matter, in said embodiment the calcination is performed at a temperature in the range of 350° C. to 650° C. and for a period in the range of 1 to 10 hours.

According to an aspect of the present subject matter, in said embodiment the catalyst has a surface area in the range of 100 to 400 nit/gm, preferably in the range of 100 to 250 $m^2$/gm; average pore diameter in the range of 5 to 25 nm; and average pore volume in the range of 0.4 to 1 cc/gm.

In yet another embodiment, a process for production of carbon nanotube comprising contacting a hydrocarbon feed in vapour form with the catalyst as disclosed in present invention in a reactor under pre-determined reaction conditions to obtain carbon nanotube.

According to an aspect of the present subject matter, in said embodiment the hydrocarbon feed comprises of straight or branched chain components of $C_1$ to $C_{30}$ molecules.

According to an aspect of the present subject matter, in said embodiment the hydrocarbon feed is having a boiling range upto 550° C.

According to an aspect of the present subject matter, in said embodiment the hydrocarbon feed is selected from the group comprising of methane, ethane, ethylene, butane, liquid petroleum gas, naphtha, kerosene, jet fuel, gas oil, vacuum gas oil or mixture thereof.

According to an aspect of the present subject matter, in said embodiment the process is carried out at a temperature in the range of 600 to 900° C.

According to an aspect of the present subject matter, in said embodiment the reactor is selected from the group comprising of horizontal fixed bed, vertical fixed bed, moving bed reactor, fluidized continuous bed reactor, fluidized semi-continuous bed reactor.

According to an aspect of the present subject matter, in said embodiment the carbon nanotube will have density the range of 0.01 to 0.2 g/cc, tube diameter in the rage of 5 to 30 nm, and purity more than 95 wt %.

In an implementation, appropriate amounts of the precursors of transitional metal (M) wherein M is comprising of iron or cobalt or nickel, and precursors of structural promoters (either Mn or Mo) dissolved separately in suitable quantity of water. The precursors for M is selected from nitrate, acetate, acetyl acetonate, chloride or sulfate forms of iron, cobalt or nickel, preferably nitrate precursor is dissolved in de-mineralized water. Further structural promoter precursors for manganese selected from nitrate, chloride or sulphate form, while precursor for molybdenum is selected from ammonium hepta molybdate tetrahydrate. On the other hand, primary oxide component of the binary oxide support is selected from nitrate, acetate, acetyl acetonate, chloride or sulphate form of Group II metals, preferably magnesium, calcium, barium, more preferably nitrate form is dissolved in suitable quantity of de-mineralized water. Further, the above prepared solutions mixed together in a separate vessel, and is referred as solutions I.

In an implementation, secondary component of binary oxide precursor is selected from stabilized colloidal solution preferably selected from sodium silicate, sodium aluminate, ammonium polysilicate, preferably ammonium polysilicate and is referred as solution II. However, precursor for the second component of binary oxide precursor is not limited to nitrate, chloride, sulphate, acetate, acetyl acetonate.

In an implementation, solution I and II simultaneously precipitate in the presence of calculated amounts of water under suitable pH to achieve the homogeneous precipitation and intimate metal-support interaction of metal, promoter and oxide precursors of support. The pH of the precipitation medium is maintained preferably in the range of 7 to 10, more preferably between 8 to 9. The resulted catalyst slurry is washed with hot water and dried at 100° C. followed by calcination at 500° C. for 5 hrs.

The role of structural promoters preferably manganese and molybdenum in the catalyst composition is to suppress the agglomeration of active phases by altering the dispersion of active metals through metal-metal interaction and therefore CNT growth over the catalyst particles renders uniform.

The choice of support for the disclosed catalyst is selected by several considerations including acid-base properties, electronic modification, dispersion, and metal-support interactions. The support materials are necessary to obtain a high dispersion and a narrow distribution of metal nanoparticles, which is prerequisite to obtain a high catalytic performance of catalysts. The nature of oxide support also can interplay with catalytic metals, which influence the catalytic activity.

The endurance activity of the catalyst is dependent on type of metal, promoter and support being used for the process. Under this premise, suitable selection of metal, promoter and support combination interplay the structural controlled morphology of CNT. In this context, the disclosed catalyst preferred with binary oxide support with tunable acid-base properties makes the catalyst of higher activity for CNT growth. The acidic properties of binary oxide support emanates from oxides of boron, aluminum, silicon and basic nature emanates from oxides of magnesium, calcium, barium, preferably combination of magnesia-silica, magnesia-boria, and magnesia-alumina.

In an implementation, the disclosed catalyst composition comprising of nanosize crystallite of catalysts metallic particles in highly dispersed form, wherein oxides of metallic component and structural and textural promoter component is in strongly interacted phase. However, the presence of nanosize catalytic species renders the catalyst is active for CNT growth during hydrocarbon decomposition.

In an implementation, disclosed catalysts have shown surface area in the range 100 to 400 m²/gm, which can be attributed to pore morphology, nature of metals, support and pH of preparation condition.

In an implementation, the CNT growth for the disclosed catalysts has been evaluated in a vertical or horizontal reactor, wherein liquid hydrocarbon of boiling range up to 150° C. is fed into the heated reactor in the form of vapour to decompose over the catalyst in the centre of the reactor zone maintaining at temperature of 600 to 900° C., preferably in the range 600 to 700 ° C. The deposition of hydrocarbon vapour, preferably petroleum naphtha is fed into the reactor, wherein reactor is selected the horizontal or vertical fixed bed, moving bed, fluidized bed either in continuous or semi continuous mode, preferably fixed bed reactor.

In an implementation, said hydrocarbon feed comprises of straight, branched chain components of $C_1$ to $C_{30}$, preferably $C_1$ to $C_{10}$ molecules which are dehydrogenated on acid-base sites of the catalyst to provide fragmented products and subsequently decomposed to form CNT on the metallic sites of the catalyst. The catalyst composition with acid-base sites within the pores are of sufficient concentration and spaced for molecule travels from the pore mouth to the interior of the pore, which helps in increase of CNT yield.

In an implementation, thus obtained carbon nanotube characterized with density in the range of 0.01 to 0.2 g/cc, tube diameter distribution is in the rage of 5 to 30 nm with purity greater than 95wt %.

In an implementation, the catalyst composition with M as iron yields the CNT with ultra low bulk density in the range of 0.01 to 0.05 g/cc with tube diameter in the range of 5 to 15 nm.

In an implementation, the catalyst composition with M as cobalt yields the CNT with bulk density in the range of 0.08 to 0.15 g/cc, tube diameter in the range of 8 to 20 nm.

In an implementation, the catalyst composition with M as nickel yields the CNT with bulk density in the range of 0.1 to 0.2 g/cc with tube diameter in the range of 15 to 30 nm.

The following are examples of the few catalysts prepared for CNT growth process by decomposition of naphtha without pre-reduction in hydrogen.

Example 1: Preparation of [$(Fe_{20}Mn_{18})$ $(Mo_2)$] $(MgSiO_x)$ (Cat-1)

20 gm of Iron nitrate Nona hydrate and 10 gm of manganese nitrate hexa hydrate and 0.8 gm of ammonium hepta molybdate tetrahydrate are separately dissolved in 50 mL of de-mineralized water. The resultant precursor solution is mixed together. Further, 40 gm of magnesium nitrate hexa hydrate is dissolved in 50 mL of de-mineralized water and added to the above metal precursor solution. The obtained solution is kept under stirring for 10 min and taken in separate dropping funnel, which is referred as solution A. On the other hand, 10 mL of 30 wt % silica of ammonium polysilicate solution is makeup with ammonium hydroxide solution, which is referred as solution B. Further, solution A and B are simultaneously precipitated into a separate beaker containing 50 ml of de-mineralized water wherein pH is being maintained at 8.5. After completion of precipitation process, catalyst slurry is filtered under vacuum to remove the excess of water and resultant catalyst mass is washed with warm de-ionized water. The obtained filtrate cake is kept in oven at 100° C. for 12 hr and then calcined at 500° C. for 5 hrs. The synthesized catalyst is further characterized and evaluated its activity for the production of carbon nanotubes using naphtha as feedstock.

Example 2: Preparation of $(Co_{20}Mn_{18}Mo_2)$ $MgSiO_x$ (Cat-2)

20 gm of cobalt nitrate hexa hydrate and 10 gm of manganese nitrate hexa hydrate and 0.8 gm of ammonium hepta molybdate tetrahydrate are separately dissolved in 50 mL of de-mineralized water. The resultant precursor solution is mixed together. Further, 40 gm of magnesium nitrate hexa hydrate is dissolved in 50 mL of de-mineralized water and add to the above metal precursor solution. The obtained solution is kept under stirring for 10 min and taken in separate dropping funnel, which is referred as solution A. On the other hand, 10 mL of 30 wt % silica of ammonium polysilicate solution is makeup with ammonium hydroxide solution is referred as solution B. Further, solution A and B are simultaneously precipitate into a separate beaker containing 50 ml of de-mineralized water wherein pH is being maintained at 8.5. After completion of precipitation process, catalyst slurry is filtered under vacuum to remove the excess of water and resultant catalyst mass is washed with warm de-ionized water. The obtained filtrate cake is kept in oven at 100° C. for 12 hr and then calcined at 500° C. for 5 hrs. The synthesized catalyst is further characterized and evaluated its activity for the production of carbon nanotubes using naphtha as feedstock.

Example 3: Preparation of $(Ni_{20}Mn_{18}Mo_2)$ $MgSiO_x$ (Cat-3)

20 gm of nickel nitrate hexa hydrate and 10 gm of manganese nitrate hexa hydrate and 0.8 gm of ammonium hepta molybdate tetrahydrate are separately dissolved in 50 mL of de-mineralized water. The resultant precursor solution is mixed together. Further, 40 gm of magnesium nitrate hexa hydrate is dissolved in 50 mL of de-mineralized water and add to the above metal precursor solution. The obtained solution is kept under stirring for 10 min and taken in separate dropping funnel, which is referred as solution A. On the other hand, 10 mL of 30 wt % silica of ammonium polysilicate solution is makeup with ammonium hydroxide solution is referred as solution B. Further, solution A and B are simultaneously precipitate into a separate beaker containing 50 ml of de-mineralized water wherein pH is being maintained at 8.5. After completion of precipitation process, catalyst slurry is filtered under vacuum to remove the excess of water and resultant catalyst mass is washed with warm de-ionized water. The obtained filtrate cake is kept in oven at 100° C. for 12 hr and then calcined at 500° C. for 5 hrs. The synthesized catalyst is further characterized and evaluated its activity for the production of carbon nanotubes using naphtha as feedstock.

Example 4: Preparation of $(Fe_{22}Mo_8)$ $MgSiO_x$ (Cat-4)

70 gm of iron nitrate nona hydrate and 10 gm of ammonium heptamolybdate tetra hydrate are separately dissolved in 50 mL of de-mineralized water and mixed together under stirring for 30 minutes. Further, 40 gm of magnesium nitrate hexa hydrate is dissolved in 50 mL of de-mineralized water and add to the above metal precursor solution. The obtained solution is kept under stirring for 10 min and taken in separate dropping funnel and is referred as solution A. On the other hand, 10 mL of 30 wt % silica of ammonium polysilicate solution is makeup with ammonium hydroxide solution and is referred as solution B. Further, solution A and B are simultaneously precipitate into a separate beaker containing 50 ml of de-mineralized water wherein pH is being maintained at 8.5. After completion of precipitation process, catalyst slurry is filtered under vacuum to remove the excess of water and resultant catalyst mass is washed with warm de-ionized water. The obtained filtrate cake is kept in oven at 100° C. for 12 hr and then calcined at 500° C. for 5 hrs. The synthesized catalyst is further characterized and evaluated its activity for the production of carbon nanotubes using naphtha as feedstock.

Example 5: Preparation of $(Co_{22}Mo_8)$ $MgSiO_x$ (Cat-5)

50 gm of cobalt nitrate hexa hydrate and 10 gm of ammonium heptamolybdate tetra hydrate are separately dissolved in 50 mL of de-mineralized water and mixed together under stirring for 30 minutes. Further, 40 gm of magnesium nitrate hexa hydrate is dissolved in 50 mL of de-mineralized water and add to the above metal precursor solution. The obtained solution is kept under stirring for 10 min and taken in separate dropping funnel and is referred as solution A. On the other hand, 10 mL of 30 wt % silica of ammonium polysilicate solution is makeup with ammonium hydroxide solution and is referred as solution B. Further, solution A and B are simultaneously precipitate into a separate beaker containing 50 ml of de-mineralized water wherein pH is being maintained at 8.5. After completion of precipitation process, catalyst slurry is filtered under vacuum to remove the excess of water and resultant catalyst mass is washed with warm de-ionized water. The obtained filtrate cake is kept in oven at 100° C. for 12 hr and then calcined at 500° C. for 5 hrs. The synthesized catalyst is further characterized and evaluated its activity for the production of carbon nanotubes using naphtha as feedstock.

Example 6: Preparation of $(Ni_{22}Mo_8)$ $MgSiO_x$ (Cat-6)

50 gm of nickel nitrate hexa hydrate and 10 gm of ammonium heptamolybdate tetra hydrate are separately dissolved in 50 mL of de-mineralized water and mixed together under stirring for 30 minutes. Further, 40 gm of magnesium nitrate hexa hydrate is dissolved in 50 mL of de-mineralized water and add to the above metal precursor solution. The obtained solution is kept under stirring for 10 min and taken in separate dropping funnel and is referred as solution A. On the other hand, 10 mL of 30 wt % silica of ammonium polysilicate solution is makeup with ammonium hydroxide solution and is referred as solution B. Further, solution A and B are simultaneously precipitate into a separate beaker containing 50 ml of de-mineralized water wherein pH is being maintained at 8.5. After completion of precipitation process, catalyst slurry is filtered under vacuum to remove the excess of water and resultant catalyst mass is washed with warm de-ionized water. The obtained filtrate cake is kept in oven at 100° C. for 12 hr and then calcined at 500° C. for 5 hrs. The synthesized catalyst is further characterized and evaluated its activity for the production of carbon nanotubes using naphtha as feedstock.

Catalyst Evaluation:

In a vertical reactor, one gram of catalyst powder is loaded in the centre of the reactor, where the catalyst is being heated upto the reaction temperature of 650° C. in nitrogen gas at a flow rate of 3 liter/hr. After attaining the desired temperature, naphtha of boiling range upto 150° C. is fed into the reactor with help of evaporator, wherein naphtha gets vaporize under programmable heating according to the boiling fraction of the feed. The feed flow rate is maintained at 30 ml/hr and is continued for 8 hrs for all cases for the sake of comparison for all the catalysts. The catalytic efficacy of naphtha decomposition process is continuously monitored by on-line gas chromatography equipped with TCD/FID detectors (Perkin Elmer Make Gas Analyzer) for the product gas analysis. The analytical data suggests that product gas mainly comprises hydrogen as main by-product along with methane. After 8 h, feed heater of the evaporator has been stopped at the end of process and reactor is cooled down under nitrogen gas unto the room temperature. Further, carbon nanotubes (CNT) obtained by the naphtha decomposition process is investigated by Transmission electron microscopy (TEM), X-ray diffraction (XRD), Braunner-Emmet-Teller surface area (SA).

TABLE 1

Physico-chemical properties of catalysts and corresponding CNT

| Catalyst | BET surface area of catalyst (m²/gm) | Pore volume (cc/gm) | Average pore diameter (nm) | CNT Yield (g/g-cat) | CNT AD4 (nm) | Bulk density of CNT (g/cc) | BET surface area of CNT (m²/gm) |
|---|---|---|---|---|---|---|---|
| Cat-1 | 242 | 1.25 | 15.6 | 48 | 5 to 12 | 0.01 | 225 |
| Cat-2 | 182 | 1.07 | 13.8 | 60 | 8 to 15 | 0.06 | 192 |
| Cat-3 | 188 | 0.92 | 10.6 | 35 | 10 to 20 | 0.17 | 150 |
| Cat-4 | 203 | 0.90 | 10.2 | 40 | 4 to 15 | 0.03 | 205 |
| Cat-5 | 182 | 0.86 | 11.0 | 46 | 8 to 20 | 0.08 | 186 |
| Cat-6 | 166 | 0.70 | 10.6 | 28 | 15 to 25 | 0.2 | 148 |

While specific language has been used to describe the present subject matter, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

The invention claimed is:

1. A catalyst for producing carbon nanotube (CNT) with bulk density in the range of 0.01 to 0.2 g/cc from the liquid hydrocarbons of crude oil represented by formula:

[(M$_x$Mn$_y$)Mo$_z$] [Binary metal oxide]$_{(100-(x+y+z))}$

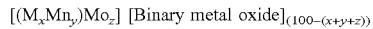

wherein x, y and z are weight percentage based on total weight of the catalyst;
x is in the range of 1 to 25 wt %, y is in the range of 0.1 to 20 wt % and z is in the range of 0.0 to 10 wt %; and
M is a metal selected from group consisting of iron, cobalt and nickel;
wherein the binary metal oxide is selected from the group consisting of magnesium oxide, calcium oxide, barium oxide, aluminium oxide, silicon oxide, boron oxide, and combinations thereof;
wherein the catalyst has a surface area in the range of 100 to 400 m²/gm, an average pore diameter in the range of 5 to 25 nm, and an average pore volume in the range of 0.4 to 1 cc/gm.

2. A process for preparation of the catalyst of claim 1 for synthesizing carbon nanotube, the process comprising:
a. dissolving a precursor of a metal salt in de-mineralized water to obtain a metal salt solution;
b. dissolving a precursor of structural promoter in de-mineralized water to obtain a structural promoter solution;
c. dissolving a precursor of binary metal oxide in de-mineralized water to obtain a binary metal oxide solution;
d. mixing the metal salt solution, the structural promoter solution and the binary metal oxide solution to obtain a solution I;

e. mixing and precipitating the solution I with precursor of a textural promoter in presence of water to obtain a catalyst slurry;
f. washing the catalyst slurry with hot water and drying at a temperature; and
g. calcining the product of step (f) to obtain the catalyst.

3. The process as claimed in claim 2, wherein the precursor of metal salt is selected from the group consisting of nitrate, acetate, acetyl acetonate, chloride, and sulfate forms of iron, cobalt or nickel.

4. The process as claimed in claim 2, wherein the precursor of structural promoter is selected from the group consisting of manganese nitrate, manganese chloride, manganese sulphate or ammonium heptamolybdatetetrahydrate, and combination thereof.

5. The process as claimed in claim 2, wherein the precursor of binary metal oxide is selected from the group consisting of sodium silicate, sodium aluminate, and ammonium polysilicate.

6. The process as claimed in claim 2, wherein the binary oxide support is selected from the group consisting of nitrate, acetate, acetyl acetonate, chloride, and sulphate form of Group II metals.

7. The process as claimed in claim 2, wherein the pH of the precipitation medium is maintained in the range of 7 to 10.

8. The process as claimed in claim 2, wherein the drying in step (f) is performed at a temperature in the range of 100° C. to 200° C. and calcination in step (g) is performed at a temperature in the range of 350° C. to 650° C. for a period in the range of 1 to 10 hours.

9. The process as claimed in claim 2, wherein the catalyst has a surface area in the range of 100 to 400 m²/gm, average pore diameter in the range of 5 to 25 nm, and average pore volume in the range of 0.4 to 1 cc/gm.

10. A process for production of carbon nanotube comprising contacting a hydrocarbon feed in vapour form with the catalyst of claim 1 at a temperature in the range of 600° C. to 900° C. in a reactor to obtain carbon nanotube.

11. The process as claimed in claim 10, wherein the hydrocarbon feed comprises of straight or branched chain components of C$_1$ to C$_{30}$ molecules.

12. The process as claimed in claim 11, wherein the hydrocarbon feed is having a boiling range upto 550° C.

13. The process as claimed in claim 11, wherein the hydrocarbon feed is selected from the group consisting of methane, ethane, ethylene, butane, liquid petroleum gas, naphtha, kerosene, jet fuel, gas oil, vacuum gas oil, and mixture thereof.

14. The process as claimed in claim 10, wherein the reactor is selected from the group consisting of horizontal fixed bed, vertical fixed bed, moving bed reactor, fluidized continuous bed reactor, and fluidized semi-continuous bed reactor.

15. The process as claimed in claim 10, wherein the carbon nanotube has a density the range of 0.01 to 0.2 g/cc, tube diameter in the rage of 5 to 30 nm, and purity more than 95 wt %.

* * * * *